(12) United States Patent
Ishida et al.

(10) Patent No.: US 6,176,714 B1
(45) Date of Patent: Jan. 23, 2001

(54) EJECTOR FOR ELECTRICAL CARD CONNECTOR

(75) Inventors: Mitsuo Ishida; Toshiyuki Takada, both of Tokyo (JP)

(73) Assignee: Hirose Electric Co., Ltd., Tokyo (JP)

( * ) Notice: Under 35 U.S.C. 154(b), the term of this patent shall be extended for 0 days.

(21) Appl. No.: 09/306,450

(22) Filed: May 6, 1999

(30) Foreign Application Priority Data

Oct. 16, 1998 (JP) .................................................. 10-294338

(51) Int. Cl.$^7$ .................................................. H01R 13/62
(52) U.S. Cl. .................................................. 439/159
(58) Field of Search .................................. 439/157, 158, 439/159, 160, 327

(56) References Cited

U.S. PATENT DOCUMENTS

| | | | |
|---|---|---|---|
| 5,730,610 | * 3/1998 | Hsia et al. | 439/160 |
| 6,000,958 | * 12/1999 | Ishida et al. | 439/159 |
| 6,042,402 | * 3/2000 | Tung et al. | 439/159 |

FOREIGN PATENT DOCUMENTS 7-335317  12/1995 (JP) .

* cited by examiner

Primary Examiner—Neil Abrams
Assistant Examiner—Michael C. Zarroli
(74) Attorney, Agent, or Firm—Kanesha & Takeuchi (57) ABSTRACT

An ejector comprises an ejector bar (2), a pressed section (3) provided at an end of the ejector bar, a press button (4) rotatably linked to the pressed section for rotation between an operation position where the press button projects in the lengthwise direction of the ejector bar and a stand-by position at right angles with the ejector bar and an engaging member (8) having at one end an engaging claw (9) which is movable between an ejection position where a card is inserted or ejected and an engaging position where the engaging claw engages the rear end of a card to prevent accidental ejection of the card, the press button and the engaging member being linked such that when the press button is at the operational position, the engaging member is at the ejection position while when the press button is at the stand-by position, the engaging member is at the engaging position.

6 Claims, 8 Drawing Sheets

EJECTOR FOR ELECTRICAL CARD CONNECTOR

BACKGROUND OF THE INVENTION

1. Field of the Invention

The present invention relates to ejectors for electrical card connectors for connecting cards, such as PC cards, to connectors within equipment and, particularly, to an ejector for an electrical card connector with a mechanism for preventing accidental ejection of a card.

2. Description of the Related Art

Such an electrical card connector is provided with an ejection mechanism for ejecting a card at will. The release mechanism comprises an ejector bar depressed by the user toward the equipment and an ejector lever for receiving the depressing force from the ejector bar and changing the direction of the force to push the card in the ejection direction.

The ejector bar is provided with a press button which projects from the equipment so that the user can push the press button to operate the ejector bar. Since the press button projects from the equipment, it can be depressed by accident to eject the card which is being used. Accordingly, a few mechanisms to prevent it have been proposed.

Figure 7A:
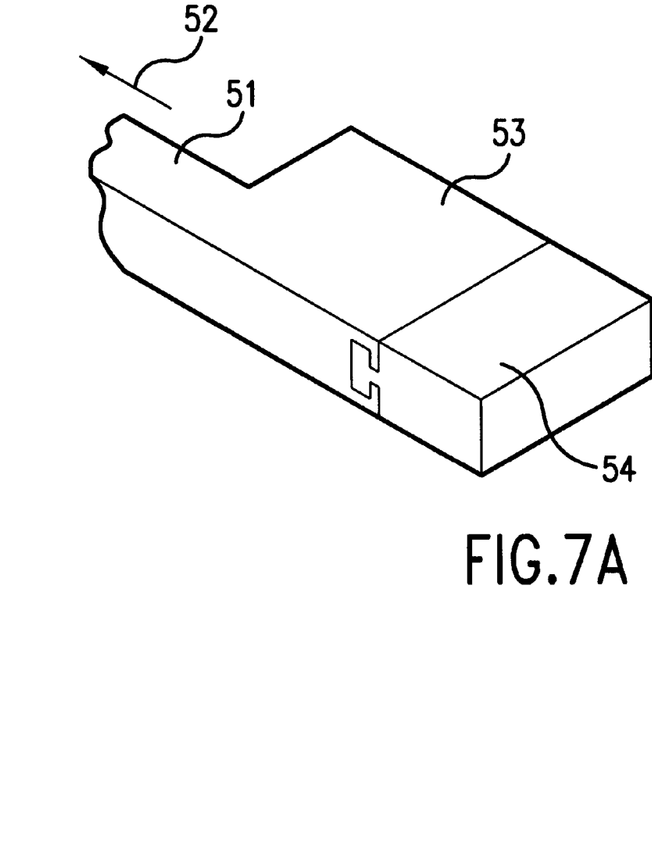
FIGS. 7(A) and (B) are perspective views of a conventional ejector, wherein the press button is at the operational position (A) and the stand-by position (B)
Figure 7B:
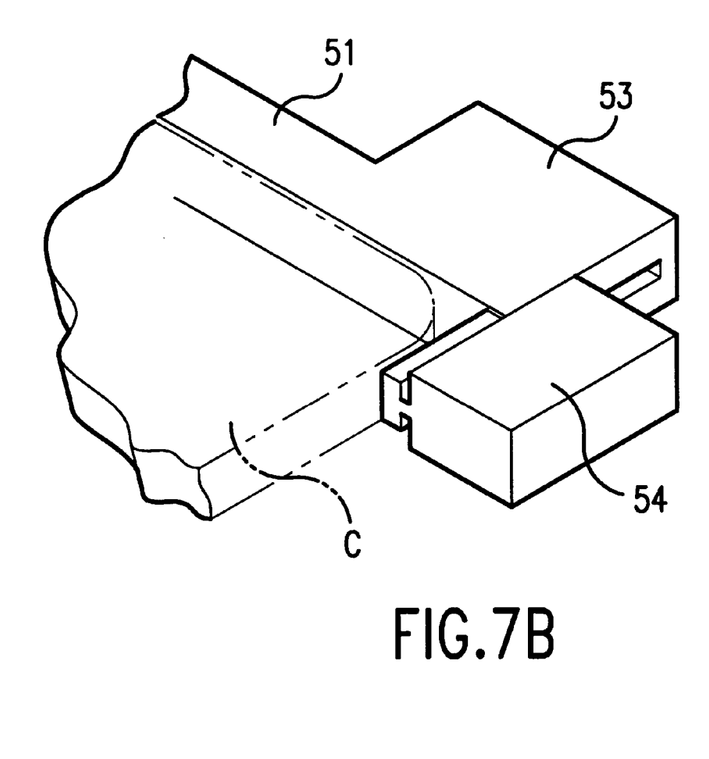

Japanese patent application Kokai No. 7-335317 discloses an accidental ejection preventive mechanism such as shown in FIGS. 7 and 8. In FIG. 7(A), an ejector bar 51 is depressed in the direction of an arrow 52 at a time of ejection of a card so that a press button 54 is provided at the rear end of a pressed section 53. The press button 54 is movable laterally with respect to the pressed section 53. In FIG. 7(B), when a card C is inserted, the press button is moved laterally to an engagement position where it is abutted against the rear edge of the card C. Thus, it prevents an accidental ejection of the card C.

Figure 8A:
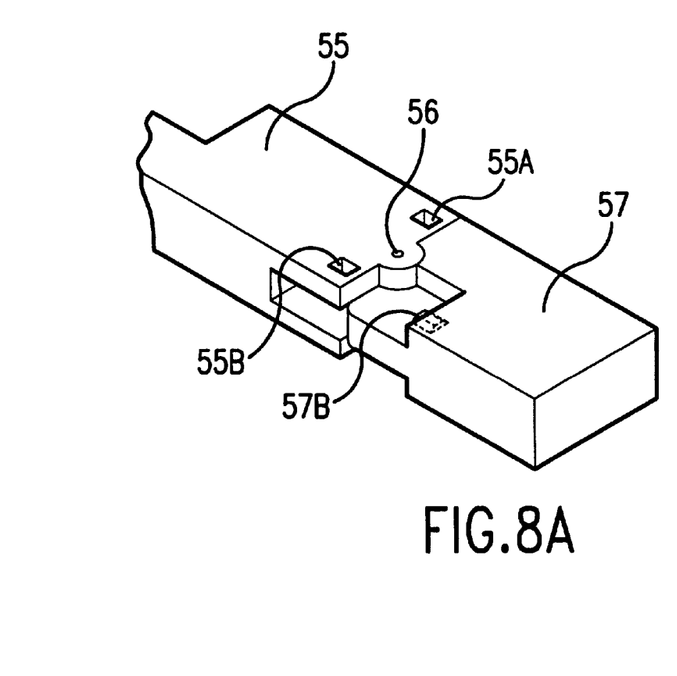
FIGS. 8(A) and (B) are perspective view of another conventional ejector, wherein the press button is at the operational position (A) and the stand-by position (B).
Figure 8B:
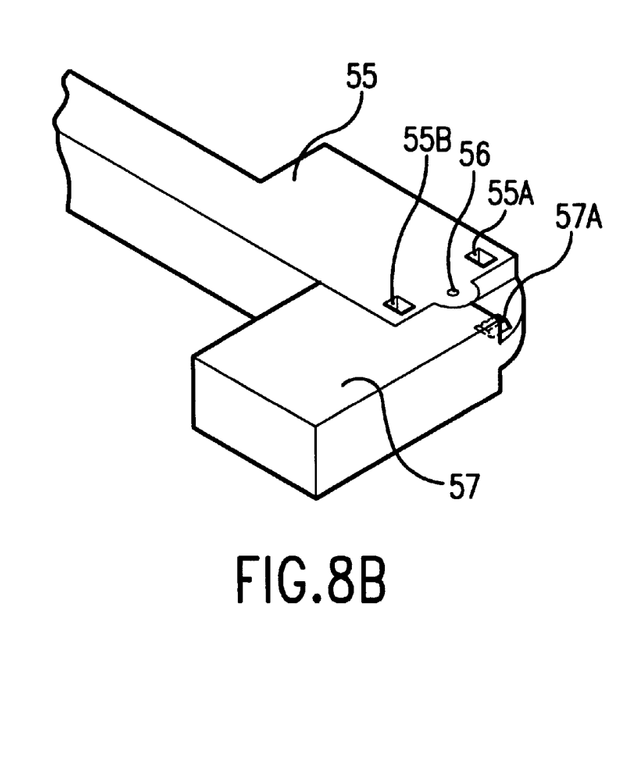

The above Japanese patent also discloses a rotatable press button. In FIG. 8(A), a rotatable press button 57 is provided at the pressed section 55 of an ejector bar with a pin 56. It is parallel to the pressed section 55 at a time of insertion or ejection of a card as shown in FIG. 8(A) and at right angles with the pressed section 55 at a time of completion of the insertion as shown in FIG. 8(B). It prevents ejection of the card at the right-angle position. The pressed section 55 and the press button 57 are provided with lock apertures 55A and 55B and lock projections 57A and 57B, respectively, so that the lock projections 57A and 57B engage the lock apertures 55A and 55B, respectively, to hold the parallel and right-angle positions of the press button in FIGS. 8(A) and 8(B), respectively.

In the above Japanese patent, by simply moving the press button to the operational position of the ejector bar it is possible to bring the card to the ejection position where the card is inserted or ejected at will.

When it is at the engagement position to prevent the card ejected, however, it is at the rear end of the card and projects from the equipment. It is so large that the user can depress with a finger. The projection of such a press button not only prevents miniaturization of the equipment but also causes accidental ejection of the card.

SUMMARY OF THE INVENTION

Accordingly, it is an object of the invention to provide an ejector for an electrical card connector able to not only prevent accidental ejection of a card but also bring the press button to a front retreated position when it is not used.

An ejector for an electrical card connector according to the invention is provided with an ejector mechanism for ejecting from the connector body the card which is inserted in the slot of a housing and connected to the connector body. The ejector mechanism comprises an ejector bar for ejection operation and a press button for pushing forwardly the ejector bar.

According to the invention, the press button is connected to the pressed section at the rear end of the ejector bar so as to be rotatable from the operational position where the press button projects from the slot in the lengthwise direction of the ejector bar to the stand-by position at right angles with the operational position.

The ejector mechanism further comprises an engaging member which has a claw portion for engagement with the rear end of a card to prevent accidental ejection of the card. The engaging member is movable between a release position where the engaging member makes it possible to insert or eject the card and an engagement position where the engaging member prevents ejection of the card.

The press button and the engaging member are connected such that when the press button is at the operational position, the engaging member is at the release position while when the press button is at the stand-by position, the engaging member is at the engaging position.

Where the press button is projected into the operational position when a card is inserted or ejected, the engaging portion of the engaging member is brought into the release position to enable insertion or ejection of the card. Then, when the press button is rotated to the standby position upon completion of the card insertion, the engaging portion of the engaging member is brought into the engaging position to prevent ejection of the card. At this point, the press button is rotated to the stand-by position and moved forwardly so that the press button is hardly projected. Since the engaging portion can be a simple piece, such as a plate claw, which engages the front edge of a card, the amount of projection is very small.

The engaging member is a rotatable lever which is rotatably connected at one end to the pressed section or press button with a pin. The engaging member and the press button are linked with a slot and a pin.

The press button and the engaging member are rotatable in opposite directions on axes at right angles with the card surface.

Alternately, the engaging member is made flexible and, at the other end, is fixed with respect to the pressed section or housing and, when the press button is moved to the stand-by position, is flexed toward the engaging position by the press button. This makes the structure simple.

It is preferred that the press button is provided with a lock mechanism which allows the press button to maintain either of the operational and stand-by positions and move to the other position only when it receives a rotational force higher than a predetermined level.

The lock mechanism comprises a movable element provided on the press button and a spring for biasing the movable element toward the pressed section of the ejector bar such that when the press button is rotated, the movable element slides on the first and second pressed faces and receive the maximum biasing force at a transitional position between the first and second pressed faces.

DESCRIPTION OF THE PREFERRED EMBODIMENTS

Embodiments of the invention will now be described with reference to FIGS. 1–3.

Figure 1A:
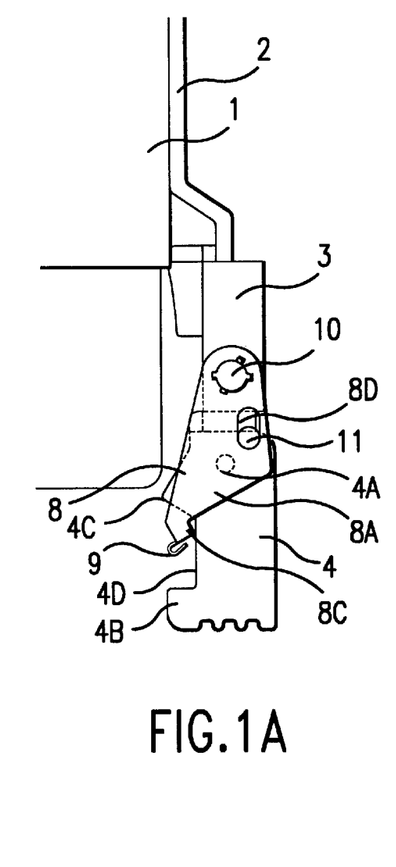
FIGS. 1(A)–(C) are plan views of part of an ejector according to an embodiment of the invention, wherein the press button is at the operational position (A), the central position (B), and the stand-by position (C)
Figure 1B:
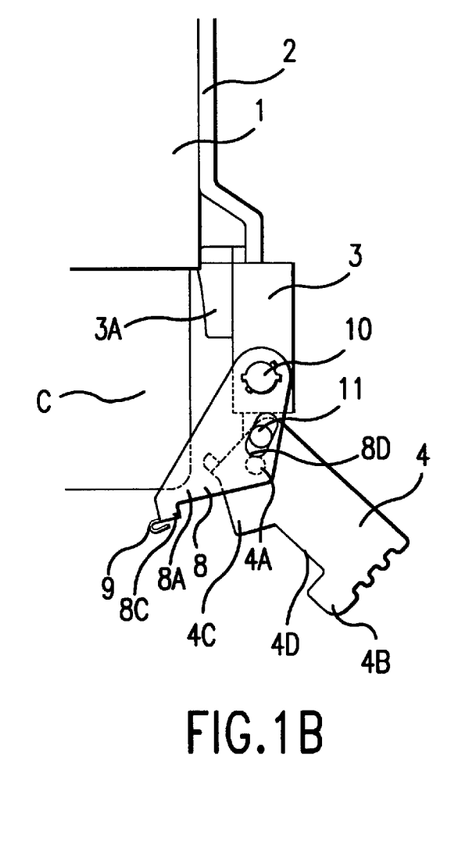
Figure 1C:
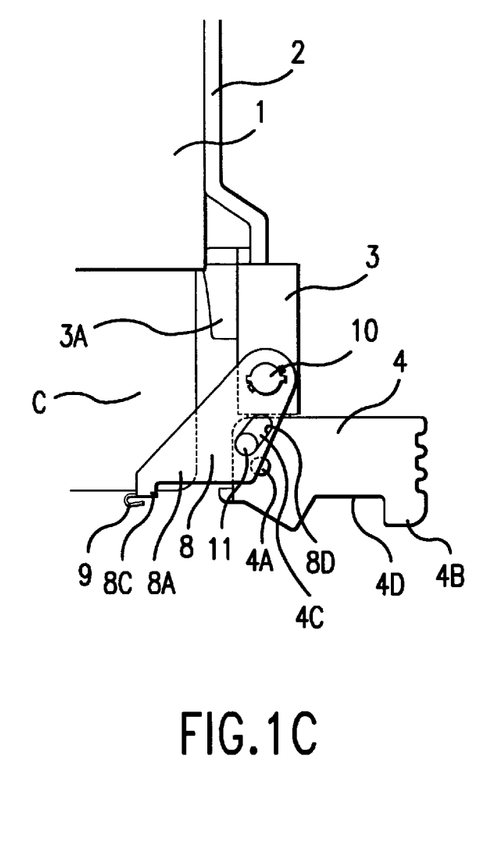
Figure 2A:
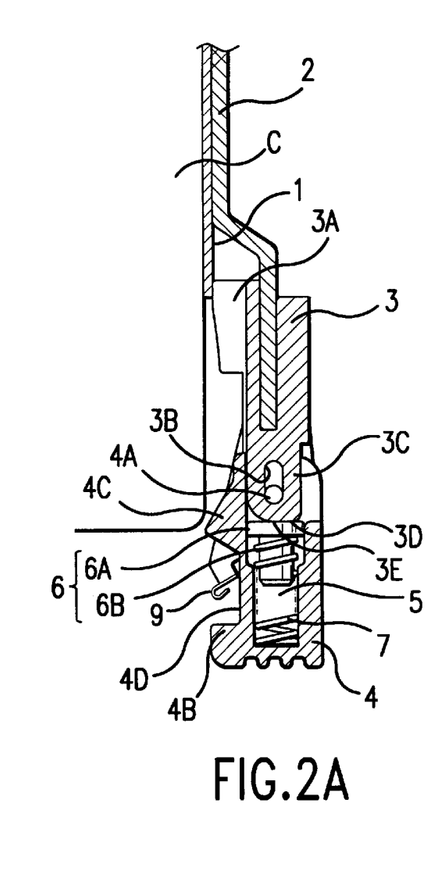
FIGS. 2(A)–(C) are sectional views corresponding to FIGS. 1(A)–(C), respectively.
Figure 2B:
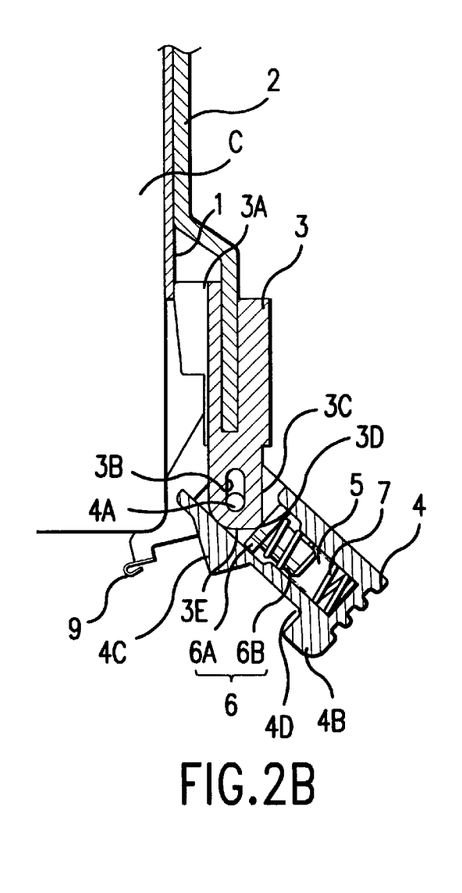
Figure 2C:
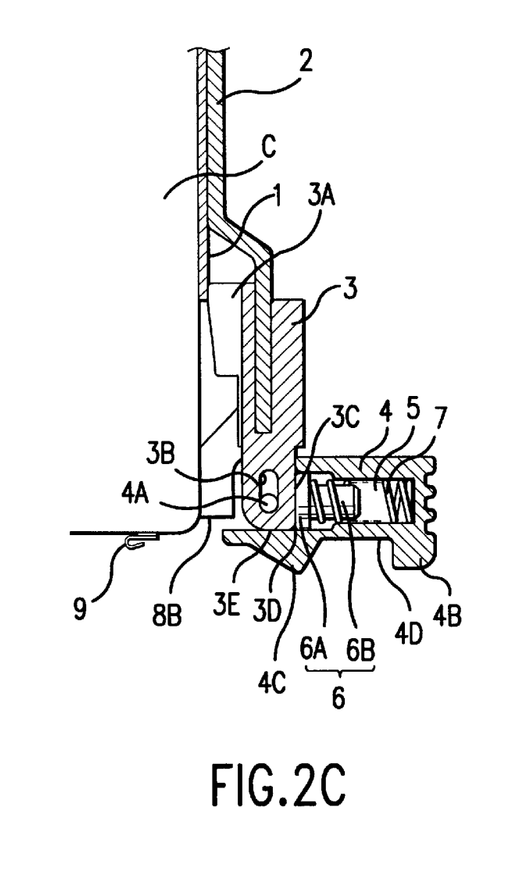

In FIGS. 1(C) and 2(C), a card C is inserted in a card case 1 which is made by bending a metal sheet, and the front edge of the card C is connected to the connector body. An ejector bar 2, which is made from a thick metal strip, is provided along a side of the card case 1 and is movable in the lengthwise direction. The rear portion of the ejector bar 2 is bent in the form of a crank, and a pressed section 3, which is made from a resin, is molded integrally with the rear end of the ejector bar 2. The pressed section 3 is provided with a guided portion 3A and guided along the side of the card case 1 when the ejector bar 2 is moved.

A press button 4, which is made from a resin, is rotatably linked to the rear end of the pressed section 3. The link is made by a pin 4A provided on the press button and a slot 3B of the pressed section 3.

As shown in FIG. 2(C), the press button 4 is provided with a cylindrical cavity 5 which opens on the side of the pin 4A, and a movable element or piston 6 is housed within the cylindrical cavity 5. The movable element 6 has a head portion 6A and a trunk portion 6B. A compression spring 7 is housed in the cylindrical cavity 5 so as to bias the head portion 6A against the pressed section 3. The head portion 6A is abutted consecutively against the pressed faces 3C, 3D, and 3E of the pressed section 3 as the press button 4 is rotated. The central pressed face 3D between the pressed faces 3C and 3E is farther from the pin 4A than the pressed faces 3C and 3E. That is, as shown in FIG. 2(B), when the movable element 6 abuts against the central pressed face 3D, the spring 7 is compressed to the maximum extent so that the pressed section 3 receives the maximum pressure from the spring 7. Consequently, unless the press button 4 receives a rotatable force higher than the above maximum force, the press button 4 remains at the operational position when the head portion 6A abuts against the pressed face 3B or at the stand-by position when the head portion 6A abuts against the pressed face 3B. Thus, the movable element 6 (head portion 6A), the spring 7, and pressed faces 3C, 3D, and 3E constitute a lock mechanism.

As shown in FIGS. 1(A) and 2(A), when the press button 4 is rotated to the ejection position, an engaging portion or claw 9 is accommodated in a recess 4D between the protruded portions 4B and 4C provided on the side of the press button 4 facing the card.

An engaging member or rotatable lever 8 is linked to the pressed section 3 and the press button 4 of the ejector bar 2. In FIGS. 1(C) and 2(C), the engaging member 8 is made by bending a metal sheet so as to have an upper and lower plates 8A and 8B, which are parallel to the sheet, and a connection plate 8C which is perpendicular to the sheet and connects the upper and lower plates 8A and 8B, forming a C-shape cross-section and a space in which a corner of the card C is accommodated. When the engaging member 8 is rotated to the position of FIGS. 1(A) and 2(A), part of the pressed section 3 and the press button 4 are housed in the above space. The engaging member 8 has at one end an engaging claw 9 and, at the other end, rotatably connected to the pressed section 3 with a shaft 10. The above engaging member may be a linking member itself. The engaging member 8 has a slot 8D where it is connected to the press button 4 with a pin 11. The slot 8D and the pin 11 link the engaging member 8 to the press button 4 while allowing the engaging member 8 to rotate on the shaft 10.

How to use the connector will be described with reference to FIGS. 1(A)–(C) and 2(A)–(C).

(1) As shown in FIGS. 1(A) and 2(A), the press button 4 is moved to the operational position which is behind the pressed section 3 of the ejector bar 2. The engaging member 8 is pulled by the pin 11 in the slot 8D and rotated on the shaft 10 to the position where it overlaps the pressed section 3 and the press button 4. At this point, the engaging claw 9 of the engaging member 8 is accommodated in the recess 4D of the press button 4 to thereby present no obstacle against the insertion or ejection of a card. Thus, the card C is inserted into the equipment and connected to the connector body within the equipment.

(2) Then, the press button 4 is moved to the stand-by position of FIG. 1(C) through the position of FIGS. 1(B) and 2(B).

(3) When the press button 4 is rotated to the stand-by position, it pushes the engaging member 8 with the pin 11 and the slot 8D so that the engaging member 8 rotates clockwise on the shaft 10. Consequently, the engaging claw 9 is brought into a position close to the rear edge of the card C to thereby prevent retreat of the card C. Thus, it is impossible to eject the card C unless the press button 4 is returned to the operational position of FIGS. 1(A) and 2(A).

Since the engaging claw 9 is small, the amount of projection from the rear edge of the card C is small, and the amount of rearward projection of the press button 4 is also small. In this way, there is no protruded object from the equipment, and there is no danger that the press button is depressed by accident to eject the card under use.

(4) The press button 4 remains in the operational position of FIGS. 1(A) and 2(A) and the stand-by position of FIGS. 1(C) and 2(C) unless it receives a rotating force higher than a predetermined level. As described above, when it is at the central position of FIG. 2(B), the press button 4 receives the maximum pressure from the spring 7 and tends to move to either the operational position of FIG. 2(A) or the stand-by position of FIG. 2(C) for being stabilized. To change the position, it is necessary to apply a force higher than the above maximum pressure. Consequently, the press button 4 remains in either of the two positions unless it receives a force higher than the predetermined level.

The pin 11 rotates around the shaft 10 in a direction different from, preferably opposite to, the direction in which the engaging claw 9 receives a force from the card so that when the card C is moved rearwardly, the engaging claw 9 is not return to the operational position by the card C.

Figure 3A:
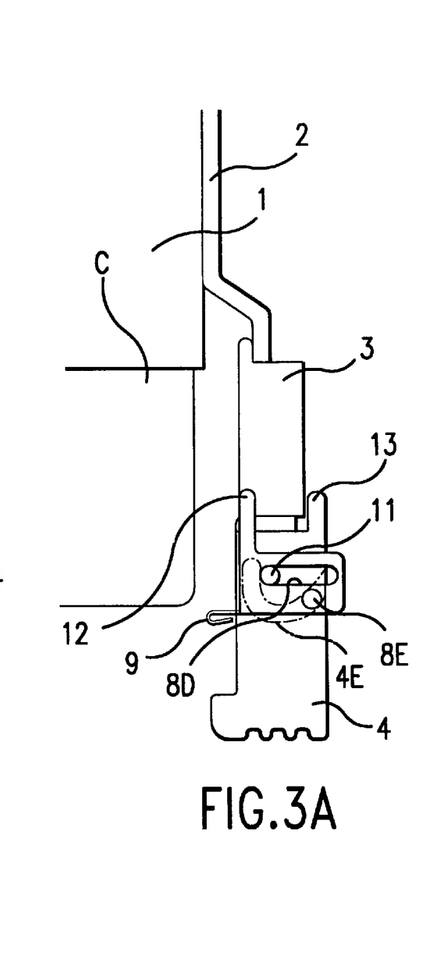
FIGS. 3(A)–(C) are plan views of part of an ejector according to another embodiment of the invention, wherein 3(A)–(C) corresponds to 1(A)–(C), respectively.
Figure 3B:
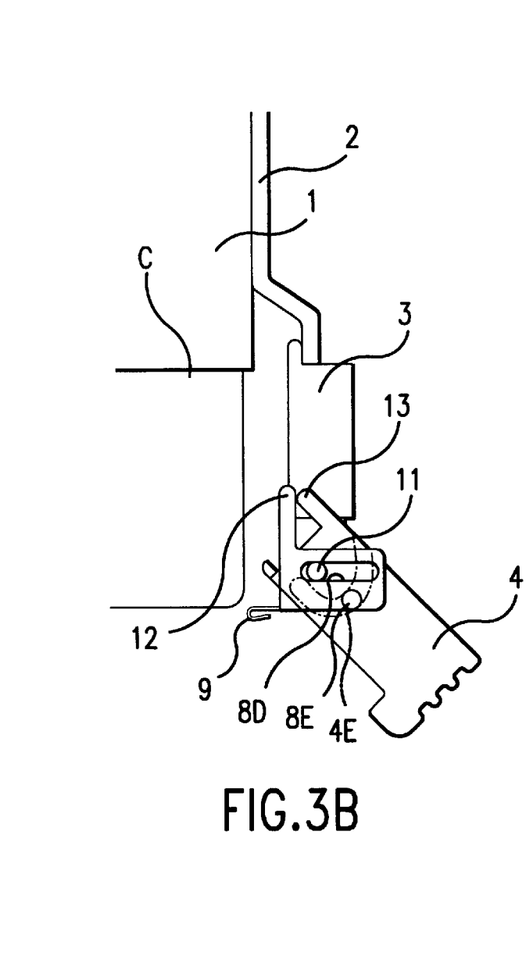
Figure 3C:
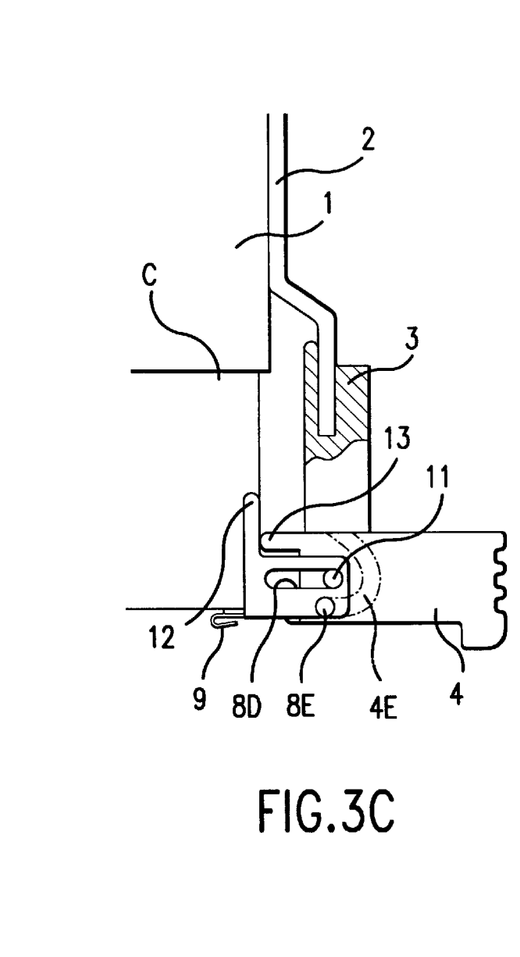

FIGS. 3(A)–(C) show another embodiment of the engaging member. As shown in FIG. 3(C), the engaging member 8 is linked to the press button 4 with a slot 8D and a pin 11 and biased to the right so that the engaging member 8 is pressed to the left on the arm 12 by the arm 13 of the press button 4. When the press button 4 is at the operational position of FIG. 3(A), the arms 12 and 13 are spaced apart, but when the press button 4 is rotated to the position of FIG. 3(C) via the position of FIG. 3(B), the arm 13 of the press button 4 presses the arm 12 of the engaging member 8 so that the engaging member 8 is moved to the left against the bias, bringing the engaging claw 9 to the position behind the rear edge of the card.

According to still another embodiment, the press button 4 and the engaging member 8 are linked with a cam mechanism. As shown by phantom line in FIGS. 3(A)–(C), the press button 4 is provided with a cam groove 4E, and the engaging member 8 is provided with a cam projection 8E which is placed in the cam groove to form a cam mechanism. When the press button 4 is moved to the stand-by position from the operational position, the cam projection 8E is guided by the cam groove 4E so that the engaging member 8 is moved to the left, bringing the engaging claw 9 to the position behind the rear edge of the card.

Figure 4A:
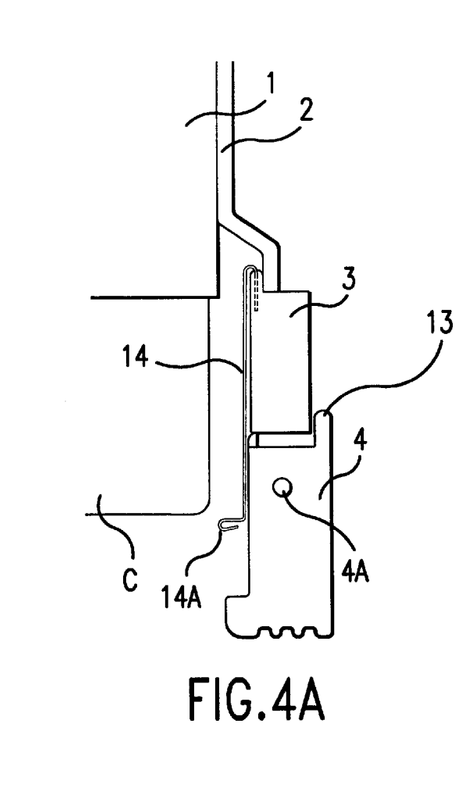
FIGS. 4(A)–(C) are plan views of part of an ejector according to still another embodiment of the invention, wherein the press button is at the operational position (A), the central position (B), and the stand-by position (C)
Figure 4B:
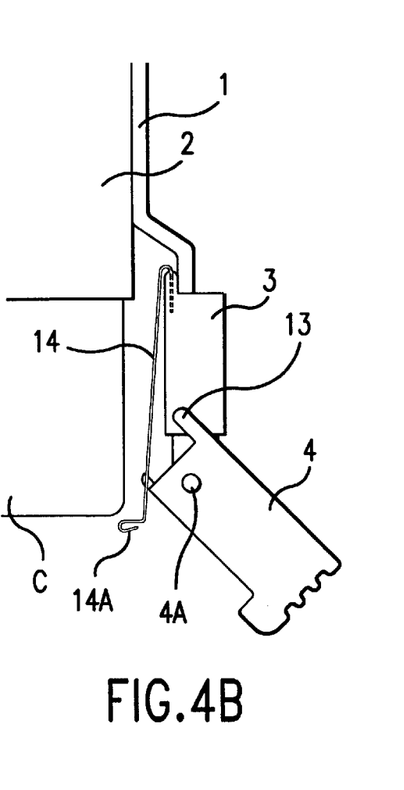
Figure 4C:
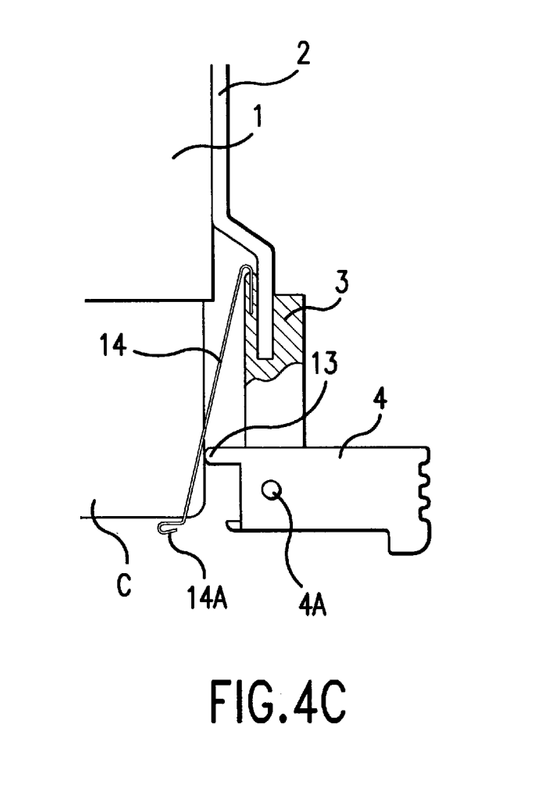

The engaging member may be flexible instead of rotatable as shown in FIG. 4(C), wherein a flat engaging member 14 has an engaging claw 14A at one end and, at the other end, is molded integrally with the pressed section 3 of the ejector bar 2. The press button 4 has an arm 13 which biases the engaging member 14.

When the press button 4 is at the operational position of FIG. 4(A), the engaging member 14 lies on a side of the press button 4 and has the minimum flexure. Consequently, the engaging claw 14A of the engaging member 14 is moved to the right and away from the rear edge of the card C. Thus, the card C is ejected at will.

When the card C is inserted, the press button 4 is rotated to the stand-by position of FIG. 4(C) via the position of FIG. 4(B). As the press button 4 rotates, the engaging member 14 is flexed to the left by the arm 13, bringing the engaging claw 14A to a position behind the rear edge of the card C to prevent ejection of the card C. A window or cutout has been provided in the engaging member to avoid interference with the card.

In this embodiment, too, it is preferred to provide the afore-mentioned lock mechanism to hold the press button at either of the operational and stand-by positions.

Figure 5:
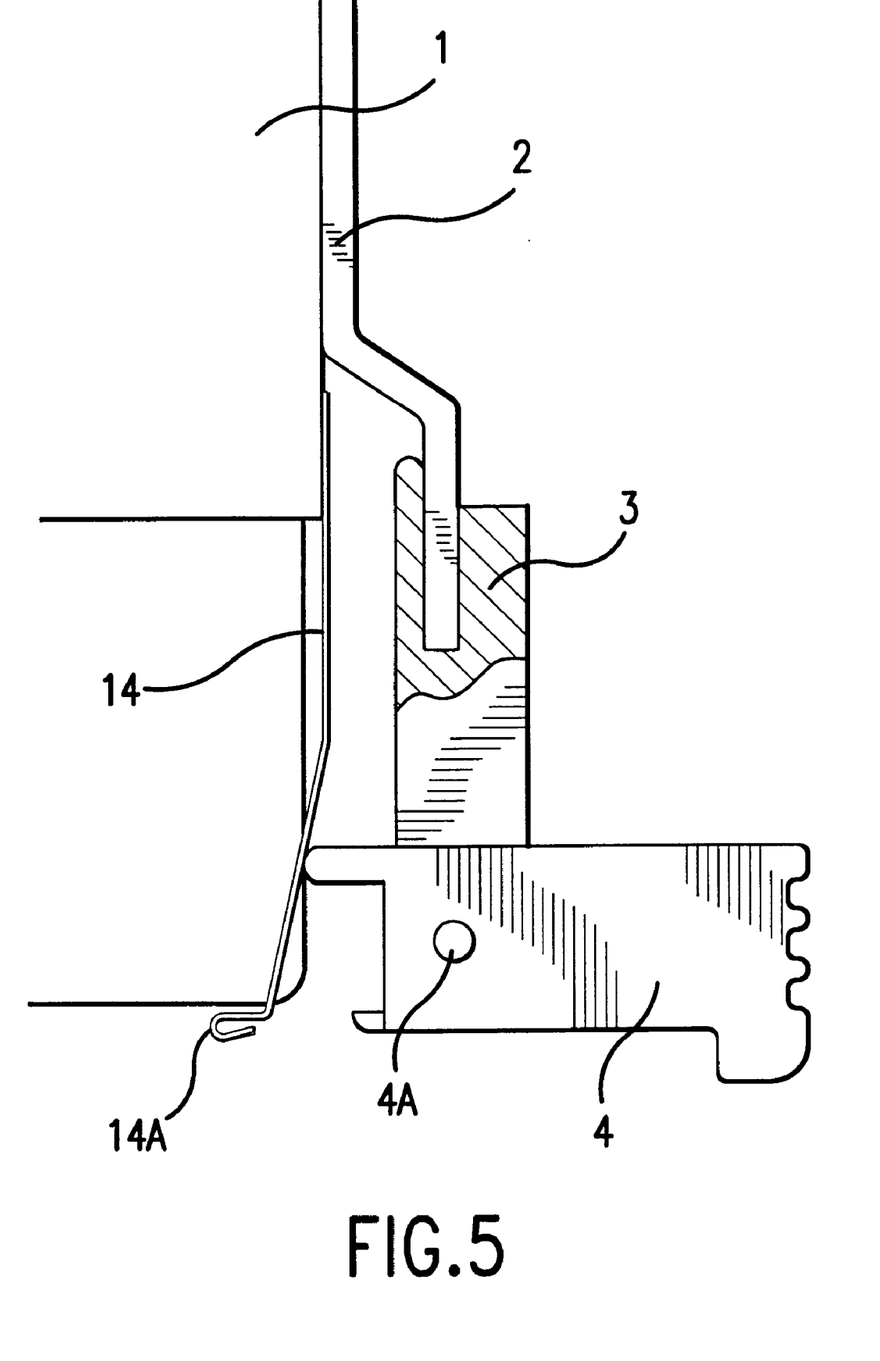
FIG. 5 is a plan view of a modification to the ejector of FIGS. 4(A)–(C)

In FIG. 5, the other end of the engaging member 14 is attached to the card case 1 which is fixed with respect to the housing. It may be fixed to another member around the engaging member.

Figure 6:
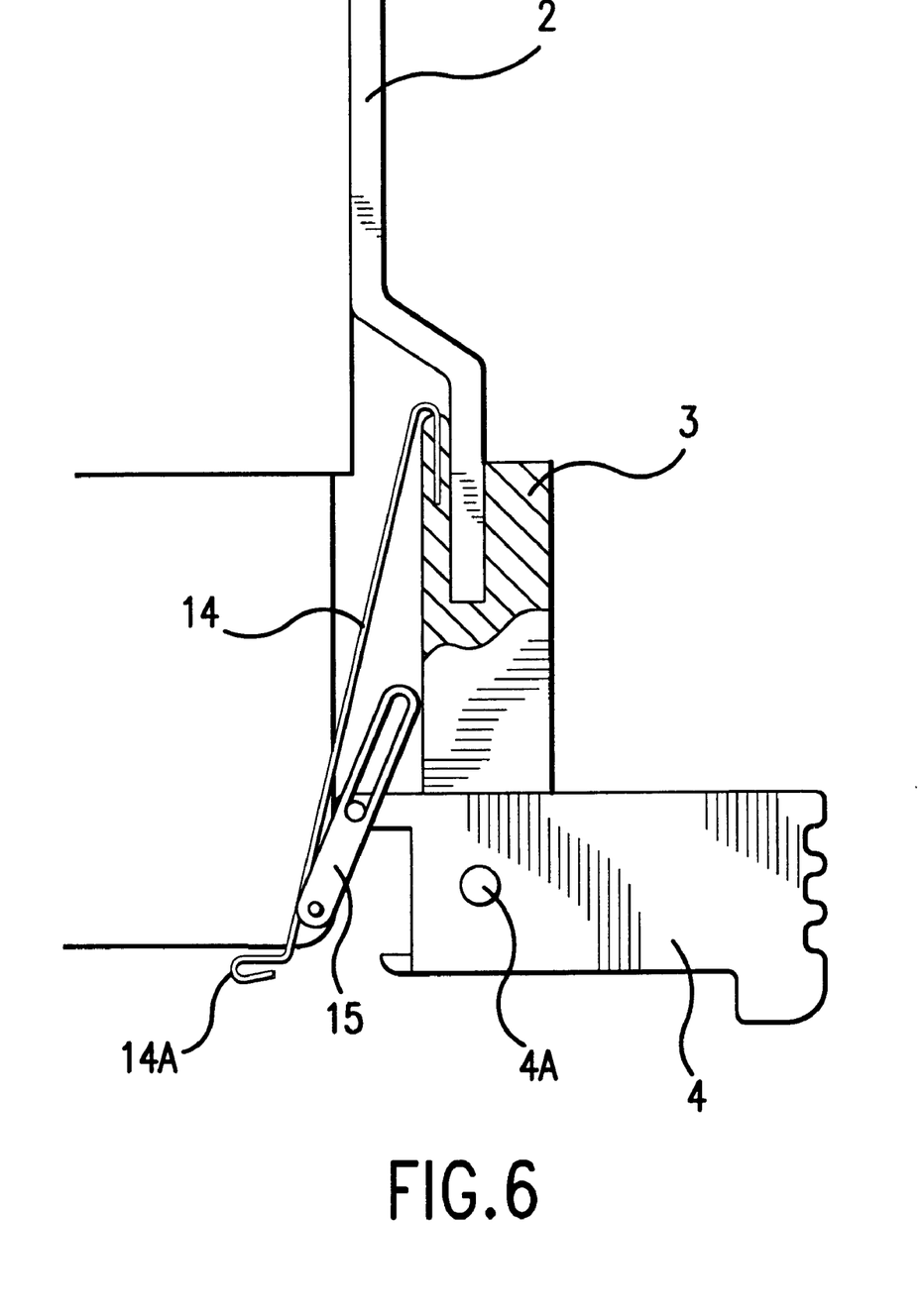
FIG. 6 is a plan view of another modification to the ejector of FIGS. 4(A)–(C)

In FIG. 6, the engaging member 14 is operated by a linking member or ring lever 15 which links the engaging member 14 and the press button 4.

As has been described above, the press button is rotated from the operational position to the stand-by position to move the engaging member having an engaging claw which engages the rear edge of a card so that when the press button is at the stand-by position, the engaging claw is minimized, thus minimizing the amount of rearward projection of the press button. As a result, the accidental depression of the press button to eject the card under use can be avoided.

What is claimed is:

1. An ejector for ejecting, from a connector body, a card which is inserted in a slot of a housing and connected to said connector body, comprising:

an ejector bar for ejecting operation;

a pressed section provided at a rear end of said ejector bar;

a press button rotatably linked to said pressed section for rotation between an operational position where said press button projects from said slot in a lengthwise direction of said ejector bar and a stand-by position at right angles with said ejector bar;

an engaging member having at one end an engaging claw which is movable between an ejection position where said card is inserted or ejected and an engaging position where said engaging member engages a rear edge of said card to prevent ejection of said card; and said press button and said engaging member being linked such that when said press button is at said operational position, said engaging member is at said ejection position while when said press button is at said stand-by position, said engaging member is at said engaging position.

2. An ejector according to claim 1, wherein said engaging member is a rotatable lever which, at the other end, is rotatably linked to said pressed section or press button with a pin and a slot.

3. An ejector according to claim 1, wherein said press button and engaging member are rotatable in opposite directions on axes perpendicular to a major surface of said card.

4. An ejector according to claim 1, wherein said engaging member is flexible and, at the other end, is fixed with respect to said pressed section or housing such that when the press button is moved to said stand-by position, said engaging member is flexed by said press button to said engaging position.

5. An ejector according to claim 1, wherein said press button is provided with a lock mechanism which allows said press button to remain at one of said operational and stand-by positions and move to the other position when it receives a rotational force higher than a predetermined level.

6. An ejector according to claim 5, wherein said lock mechanism comprises:

a movable element provided on said press button; and a spring for biasing said movable element toward said pressed section of said ejector bar such that when said press button is rotated, said movable element slides on first and second pressed faces of said pressed section and receives a maximum force from a transitional face between said first and second faces.

\* \* \* \* \*